United States Patent
Pwu et al.

(10) Patent No.: US 9,450,507 B2
(45) Date of Patent: Sep. 20, 2016

(54) POWER SUPPLY APPARATUS WITH INPUT VOLTAGE DETECTION AND METHOD OF OPERATING THE SAME

(71) Applicant: DELTA ELECTRONICS, INC., Taoyuan County (TW)

(72) Inventors: Jong-Wei Pwu, Taoyuan County (TW); Wen-Kuan Hsu, Taoyuan County (TW); Jia-Dian Lu, Taoyuan County (TW); Kun-Chi Lin, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 102 days.

(21) Appl. No.: 14/532,547

(22) Filed: Nov. 4, 2014

(65) Prior Publication Data
US 2015/0333631 A1 Nov. 19, 2015

(30) Foreign Application Priority Data
May 16, 2014 (TW) .............................. 103117255 A

(51) Int. Cl.
*H02M 7/217* (2006.01)
*H02M 3/335* (2006.01)
*H02M 1/32* (2007.01)
*H02M 7/06* (2006.01)
*H02M 1/00* (2006.01)

(52) U.S. Cl.
CPC ............... *H02M 7/217* (2013.01); *H02M 1/32* (2013.01); *H02M 3/33507* (2013.01); *H02M 3/33523* (2013.01); *H02M 7/06* (2013.01); *H02M 2001/007* (2013.01)

(58) Field of Classification Search
CPC .... H02M 1/32; H02M 3/33523; H02M 7/06; H02M 3/28; H02M 2001/007
USPC .......... 363/50, 52, 53, 56.05, 56.11; 361/18, 361/92
See application file for complete search history.

(56) References Cited

U.S. PATENT DOCUMENTS

| | | | | |
|---|---|---|---|---|
| 4,873,448 A * | 10/1989 | Shirai | ................ | H03K 17/7955 250/551 |
| 8,761,631 B2 * | 6/2014 | Shimura | ................ | G03G 15/80 399/67 |
| 8,958,713 B2 * | 2/2015 | Inukai | ................ | H04N 1/00888 345/211 |

(Continued)

FOREIGN PATENT DOCUMENTS

| | | | |
|---|---|---|---|
| JP | 2001045756 | * | 2/2001 |
| TW | 595829 | | 6/2004 |
| TW | I269518 | | 12/2006 |

OTHER PUBLICATIONS

Office Action dated Feb. 10, 2015 from corresponding No. TW 103117255.

*Primary Examiner* — Gary L Laxton
*Assistant Examiner* — Kyle J Moody
(74) *Attorney, Agent, or Firm* — Hauptman Ham, LLP

(57) ABSTRACT

A power supply apparatus with input voltage detection includes a power input side and an input detection module. The power input side has a first input terminal and a second input terminal, and the first input terminal and the second input terminal are electrically connected to a live wire and a neutral wire of an AC power source, respectively. The input detection module has two input terminals, which are corresponding electrically connected to the first input terminal and the second input terminal. The input detection module generates a detection signal to shut down the power supply apparatus when the input detection module detects that the live wire or the neutral wire is abnormal, or the live wire and the neutral wire are both abnormal.

8 Claims, 3 Drawing Sheets

(56) References Cited

U.S. PATENT DOCUMENTS

2014/0112033 A1* 4/2014 Lin .................. H02M 7/02
363/44

2014/0119084 A1* 5/2014 Ashikaga ................ H02M 1/32
363/126

2016/0013733 A1* 1/2016 Pregitzer .............. H02H 7/1252
363/126

* cited by examiner

POWER SUPPLY APPARATUS WITH INPUT VOLTAGE DETECTION AND METHOD OF OPERATING THE SAME

BACKGROUND

1. Technical Field

The present disclosure relates generally to a power supply apparatus and a method of operating the same, and more particularly to a power supply apparatus with input voltage detection and a method of operating the same.

2. Description of Related Art

With the development and progress of science and technology, electronic products with a wide range of different functions have gradually been developed. These electronic products not only meet different demands of users, but also provide more convenient life for the users. Each electronic product includes various electronic components, and the required voltages for supplying different electronic components are usually not the same. In order to provide appropriate voltage levels for normally operating each of the electronic components, the power supply or power conversion unit is used to convert the AC voltage or DC voltage into the appropriate voltage levels. In addition, in order to avoid the malfunction and damage of the power supply or the power conversion unit from the abnormal supply power of the AC power source, it is usually to install a detection circuit at the input side of the power supply or the power conversion unit. Reference is made to FIG. 1 which is a schematic circuit block diagram of a related art input detection circuit for a power supply. The power supply is supplied power by an external AC power source $V_S$, and an AC detection circuit 10A is installed at the input side of the power supply to directly detect whether the external AC power source $V_S$ is normal or abnormal.

Reference is made to FIG. 2 which is a schematic view of showing a failed detection of an AC detection circuit of a related art power supply apparatus. When the live wire $V_{SL}$ and the neutral wire $V_{SN}$ are both abnormal, the AC detection circuit 10A generates a signal to a protection circuit of the power supply to provide a protection for the power supply. In particular, the output system 20A, the power supply, and the AC detection circuit 10A are commonly grounded. Once one of the live wire or the neutral wire is abnormal, a loop Ls is formed via the grounding of the AC detection circuit 10A and the output system 20A. Accordingly, the AC detection circuit 10A fails to detect whether the live wire $V_{SL}$ or the neutral wire $V_{SN}$ of the external AC power source $V_S$ is abnormal or not. Also, the AC detection circuit 10A does not generate the signal to the protection circuit of the power supply and fail to provide a protection for the power supply.

Accordingly, it is desirable to provide a power supply apparatus with input voltage detection and a method of operating the same to use an input detection module without any grounding or an input detection module with an independent grounding which is different from that of the power supply for detecting whether the AC power source is abnormal or not.

SUMMARY

An object of the present disclosure is to provide a power supply apparatus with input voltage detection to solve the above-mentioned problems. Accordingly, the power supply apparatus with input voltage detection includes a power input side and an input detection module. The power input side has a first input terminal and a second input terminal. The first input terminal is electrically connected to a live wire of an AC power source, and the second input terminal is electrically connected to a neutral wire of the AC power source. The input detection module has a first detection terminal and a second detection terminal. The first detection terminal is electrically connected to the first input terminal, and the second detection terminal is electrically connected to the second input terminal. The input detection module generates a detection signal to shut down the power supply apparatus so as to protect the power supply apparatus when the input detection module detects that the live wire or the neutral wire is abnormal, or the live wire and the neutral wire are both abnormal.

Another object of the present invention is to provide a method of operating a power supply apparatus with input voltage detection to solve the above-mentioned problems. Accordingly, the method includes the steps of (a) providing the power supply apparatus having a power input side, and the power input side having a first input terminal and a second input terminal; the first input terminal electrically connected to a live wire of an AC power source, and the second input terminal electrically connected to a neutral wire of the AC power source; (b) providing an input detection module having a first detection terminal and a second detection terminal; the first detection terminal electrically connected to the first input terminal, and the second detection terminal electrically connected to the second input terminal; and (c) generating a detection signal by the input detection module to shut down the power supply apparatus so as to protect the power supply apparatus when the input detection module detects that the live wire or the neutral wire is abnormal, or the live wire and the neutral wire are both abnormal.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
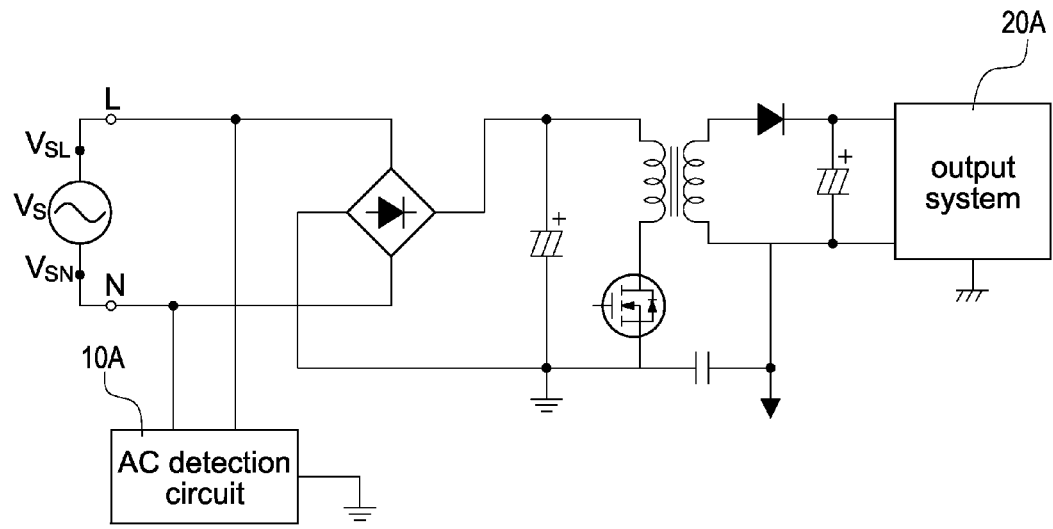
FIG. 1 is a schematic circuit block diagram of a related art input detection circuit for a power supply.
Figure 2:
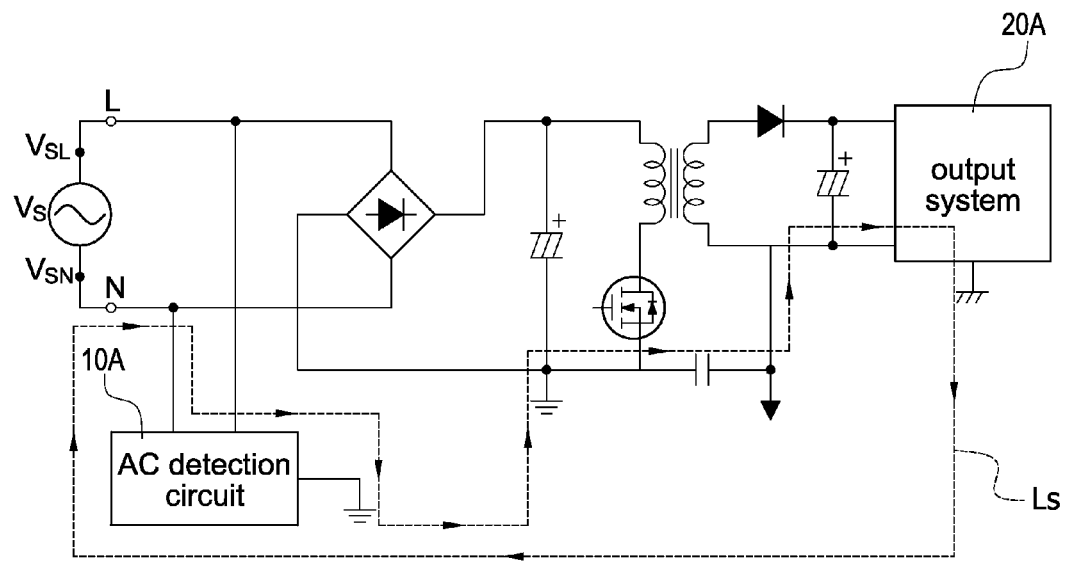
FIG. 2 is a schematic view of showing a failed detection of an AC detection circuit of a related art power supply apparatus.

Reference will now be made to the drawing figures to describe the present invention in detail.

Figure 3:
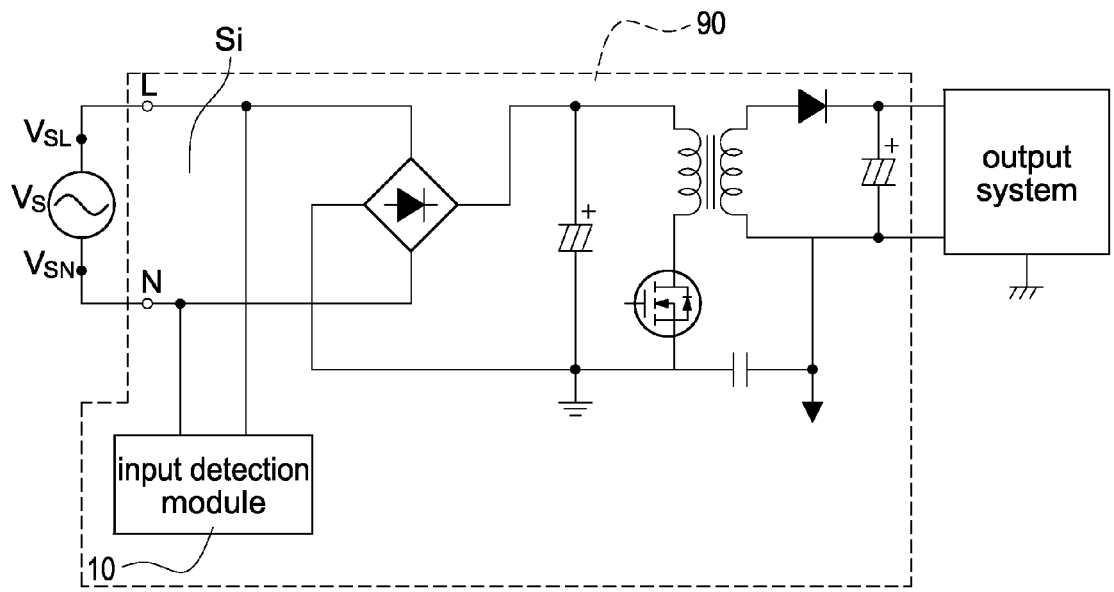
FIG. 3 is a schematic circuit block diagram of a power supply apparatus with input voltage detection according to the present disclosure.

Reference is made to FIG. 3 which is a schematic circuit block diagram of a power supply apparatus with input voltage detection according to the present disclosure. The power supply apparatus with input voltage detection includes a power supply apparatus 90, which has a power input side Si, and an input detection module 10. The power input side Si has a first input terminal and a second input terminal. In this embodiment, the first input terminal is a live wire terminal L and the second input terminal is a neutral wire terminal N. The live wire terminal L is electrically connected to a live wire $V_{SL}$ of an external AC power source $V_S$ and the neutral wire terminal N is electrically connected to a neutral wire $V_{SN}$ of the external AC power source $V_S$. Accordingly, the power supply apparatus 90 is supplied power by the external AC power source $V_S$ via the live wire $V_{SL}$ and the neutral wire $V_{SN}$. In particular, the power supply apparatus 90 can be a power supply; however, the embodiment is only exemplified but is not intended to limit the scope of the disclosure. In other words, the power apparatus which is supplied power by the AC power source is embraced within the scope of the present disclosure.

The input detection module 10 is electrically connected between the live wire terminal L and the neutral wire terminal N of the power input side Si. That is, the input detection module 10 has two detection terminals (not labeled), namely, a first detection terminal and a second detection terminal, and the first detection terminal and the second detection terminal are correspondingly electrically connected to the live wire terminal L and the neutral wire terminal N. When the live wire $V_{SL}$ or the neutral wire $V_{SN}$ is abnormal, or the live wire $V_{SL}$ and the neutral wire $V_{SN}$ are both abnormal, the input detection module 10 generates a detection signal to shut down the power supply apparatus 90 so as to protect the power supply apparatus 90. The detailed operation of the power supply apparatus with input voltage detection will be described hereinafter as follows.

Figure 4:
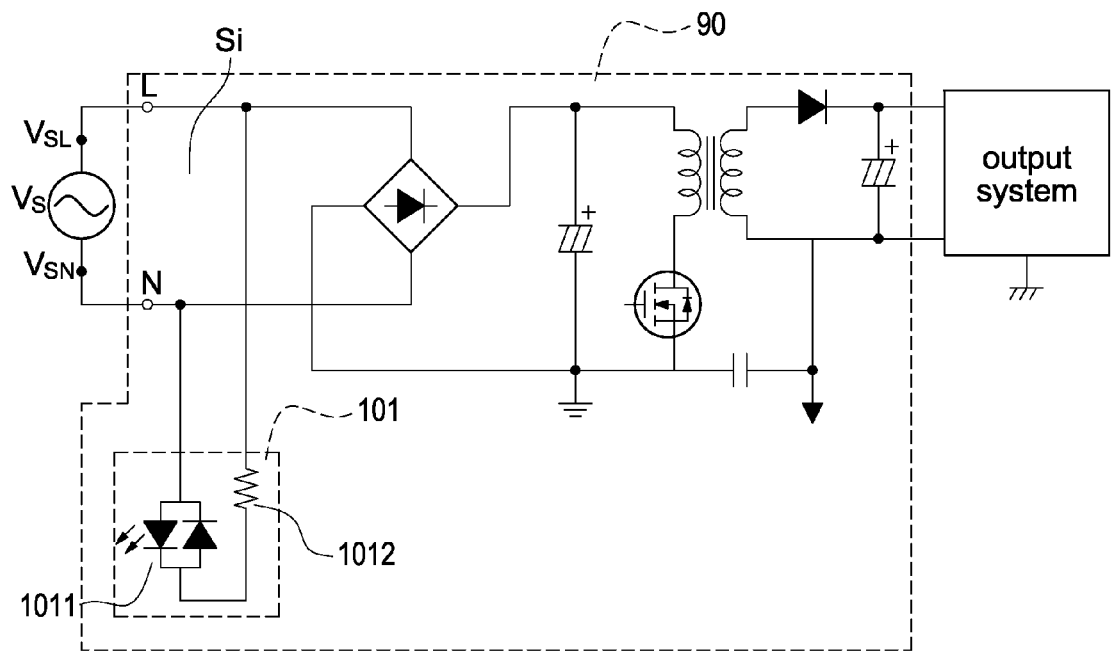
FIG. 4 is a schematic circuit block diagram of an input detection module of the power supply apparatus according to a first embodiment of the present disclosure.

Reference is made to FIG. 4 which is a schematic circuit block diagram of an input detection module of the power supply apparatus according to a first embodiment of the present disclosure. In this embodiment, the input detection module 101 has a bi-directional photoelectric coupler 1011 and a current-limiting resistor 1012. More specifically, one terminal of the bi-directional photoelectric coupler 1011 is connected in series to one terminal of the current-limiting resistor 1012, the other terminal of the bi-directional photoelectric coupler 1011 is connected to the neutral wire terminal N of the power input side Si, and the other terminal of the current-limiting resistor 1012 is connected to the live wire terminal L of the power input side Si. However, the embodiment is only exemplified but is not intended to limit the scope of the disclosure. In other words, the other terminal of the bi-directional photoelectric coupler 1011 can be connected to the live wire terminal L of the power input side Si, and the other terminal of the current-limiting resistor 1012 can be connected to the neutral wire terminal N of the power input side Si. In particular, the two embodiments can provide the same function of detecting the AC power source at the input side. In this embodiment, the input detection module 101 and the power supply apparatus 90 are isolated from ground to each other because the input detection module 101 does not provide any independent grounding. Accordingly, it is to avoid the failed protection of the power supply apparatus 90 from the detection malfunction of the input detection module 101.

When the AC power source $V_S$ normally supplies power to the power supply apparatus 90, namely, both the live wire $V_{SL}$ and the neutral wire $V_{SN}$ are normal, the AC power source $V_S$ is detected by the input detection module 101 from the live wire terminal L to the neutral wire terminal N or from the neutral wire terminal N to the live wire terminal L so that the bi-directional photoelectric coupler 1011 is turned on. Accordingly, the bi-directional photoelectric coupler 1011 continually outputs a normal detection signal (not shown). When the power supply apparatus 90 receives the normal detection signal, the power supply apparatus 90 judges that the external AC power source $V_S$ can normally supply power to the power supply apparatus 90.

When the live wire $V_{SL}$ or the neutral wire $V_{SN}$ is abnormal, or the live wire $V_{SL}$ and the neutral wire $V_{SN}$ are both abnormal, the AC power source $V_S$ does not be outputted to the input detection module 101, that is, the input detection module 101 does not receive the AC power source $V_S$ so that the bi-directional photoelectric coupler 1011 is turned off. Accordingly, the bi-directional photoelectric coupler 1011 stops outputting the normal detection signal. When the power supply apparatus 90 does not receive the normal detection signal, the power supply apparatus 90 judges that live wire $V_{SL}$ or the neutral wire $V_{SN}$ is abnormal, or the live wire $V_{SL}$ and the neutral wire $V_{SN}$ are both abnormal. Therefore, a protection mechanism (not shown) of the power supply apparatus 90 is started up to shut down the power supply apparatus 90, thus protecting the power supply apparatus 90. More specifically, the current-limiting resistor 1012 is in kilo-ohm (K ohm) for liming the current flowing through the bi-directional photoelectric coupler 1011 because the current for driving the bi-directional photoelectric coupler 1011 is in milli-ampere (mA).

Figure 5:
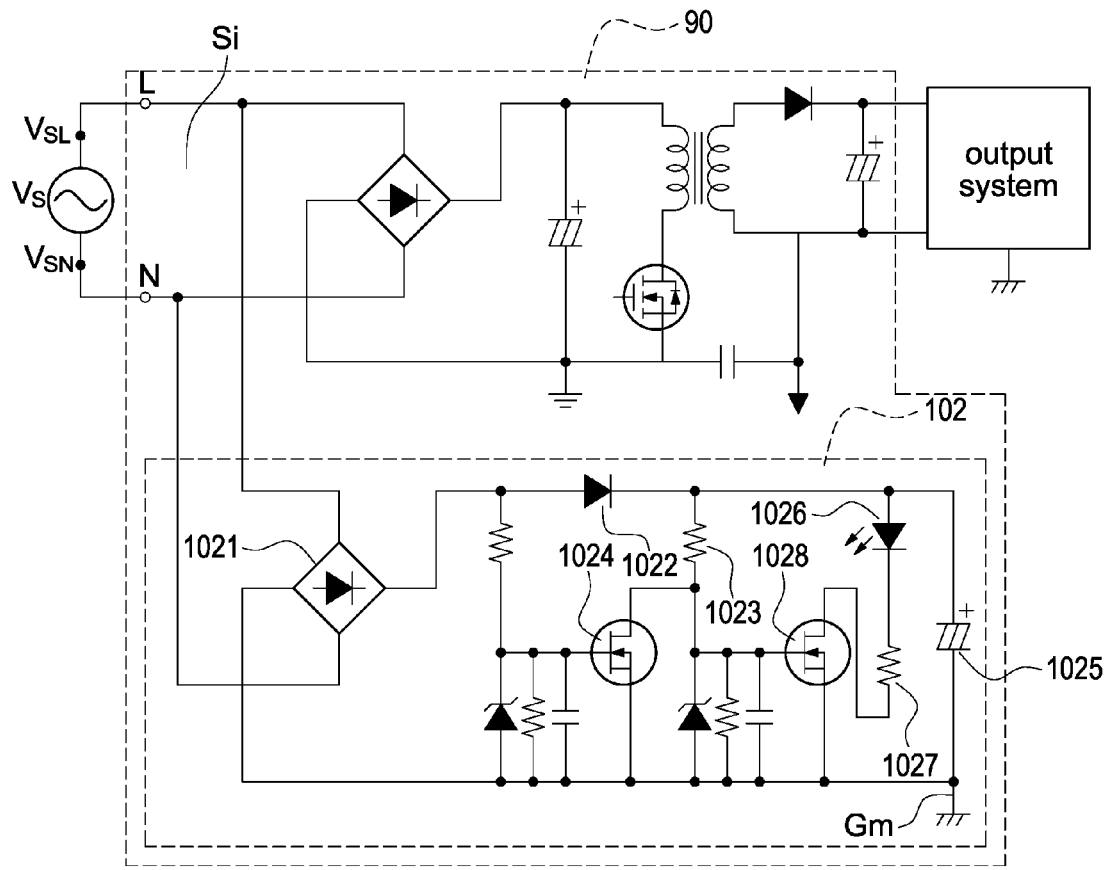
FIG. 5 is a schematic circuit block diagram of the input detection module of the power supply apparatus according to a second embodiment of the present disclosure.

Reference is made to FIG. 5 which is a schematic circuit block diagram of the input detection module of the power supply apparatus according to a second embodiment of the present disclosure. In this embodiment, the input detection module 102 mainly includes a full-wave rectifier 1021, a diode 1022, a first resistor 1023, a first transistor switch 1024, a capacitor 1025, a photoelectric coupler 1026, a second resistor 1027, and a second transistor switch 1028. An anode of the diode 1022 is electrically connected to a first output terminal of the full-wave rectifier 1021. A drain of the first transistor switch 1024 is electrically connected to a first terminal of the first resistor 1023, and a second terminal of the first resistor 1023 is electrically connected to a cathode of the diode 1022. A gate of the first transistor switch 1024 is electrically connected to a first output terminal of the full-wave rectifier 1021 and the anode of the diode 1022 via a resistor (not labeled). A drain of the second transistor switch 1028 is electrically connected to a first terminal of the second resistor 1027, and a second terminal of the second resistor 1027 is electrically connected to a cathode of the photoelectric coupler 1026. A gate of the second transistor switch 1028 is electrically connected to the drain of the first transistor switch 1024 and the first terminal of the first resistor 1023. An anode of the photoelectric coupler 1026 is electrically connected to the cathode of the diode 1022 and a first terminal of the capacitor 1025. A second terminal of the capacitor 1025, a source of the first transistor switch 1024, a source of the second transistor switch 1028, and a second terminal of the full-wave rectifier 1021 are electrically connected to a module grounding Gm. Especially, the module grounding Gm of the input detection module 102 is different from a grounding of the power supply apparatus 90. In addition, two input terminals of the full-wave rectifier 1021 are correspondingly electrically connected to the live wire terminal L and the neutral wire terminal N of the power input side Si.

When the AC power source $V_S$ normally supplies power to the power supply apparatus 90, namely, both the live wire $V_{SL}$ and the neutral wire $V_{SN}$ are normal, the AC power source $V_S$ is rectified by the full-wave rectifier 1021 to output a rectified voltage. On the one hand, the rectified voltage is divided by two divider resistors to generate a divided voltage to turn on the first transistor switch 1024. On the other hand, the rectified voltage is provided to charge the capacitor 1025 via the diode 1022. Accordingly, the second transistor switch 1028 and the photoelectric coupler 1026 are both turned on.

When the live wire $V_{SL}$ or the neutral wire $V_{SN}$ is abnormal, or the live wire $V_{SL}$ and the neutral wire $V_{SN}$ are both abnormal, the AC power source $V_S$ does not be outputted to the full-wave rectifier 1021, that is, the full-wave rectifier 1021 does not output voltage so that the first transistor switch 1024 is turned off. At this time, the capacitor 1025 is discharged via a discharging path formed by the photoelectric coupler 1026, the second resistor 1027, and the second transistor switch 1028. Accordingly, the photoelectric coupler 1026 outputs an abnormal detection signal (not shown) to a protection mechanism (not shown) of the power supply apparatus 90 to shut down and further protect the power supply apparatus 90.

Figure 6:
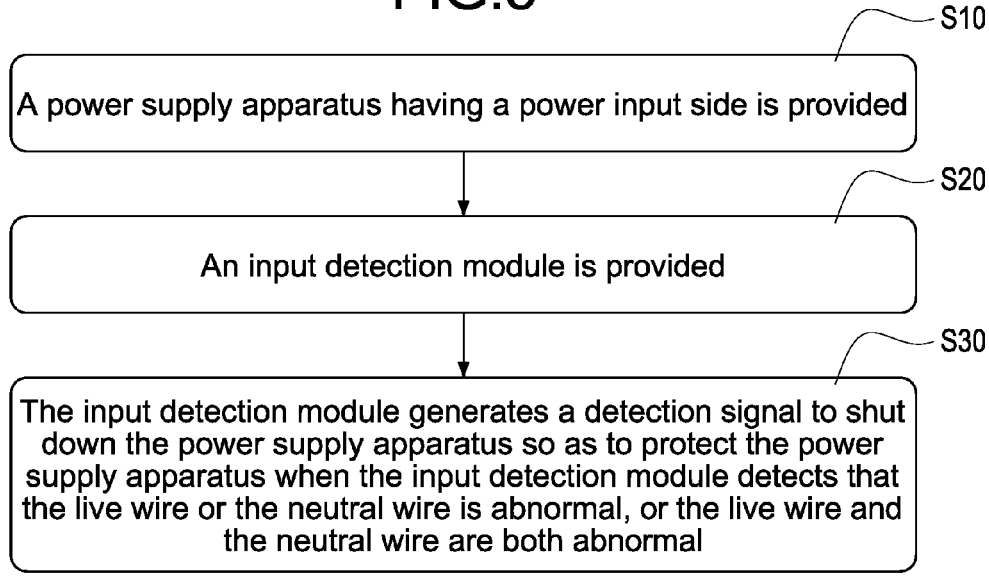
FIG. 6 is a flowchart of a method of operating a power supply apparatus with input voltage detection according to the present disclosure.

Reference is made to FIG. 6 which is a flowchart of a method of operating a power supply apparatus with input voltage detection according to the present disclosure. The method includes following steps. First, a power supply apparatus having a power input side is provided (S10). The power input side has a first input terminal and a second input terminal. In this embodiment, the first input terminal and the second input terminal are correspondingly electrically connected to a live wire and a neutral wire of an external AC power source. That is, the first input terminal is a live wire terminal and the second input terminal is a neutral wire terminal. The power supply apparatus is supplied power by the external AC power source via the live wire and the neutral wire. In particular, the power supply apparatus can be a power supply; however, the embodiment is only exemplified but is not intended to limit the scope of the disclosure. Afterward, an input detection module is provided (S20). The input detection module is electrically connected between the live wire terminal and the neutral wire terminal of the power input side. That is, the input detection module has two detection terminals, namely, a first detection terminal and a second detection terminal, and the first detection terminal and the second detection terminal are correspondingly electrically connected to the live wire terminal and the neutral wire terminal. Finally, the input detection module generates a detection signal to shut down the power supply apparatus so as to protect the power supply apparatus when the input detection module detects that the live wire or the neutral wire is abnormal, or the live wire and the neutral wire are both abnormal (S30). Especially, the input detection module provides two embodiments in present disclosure, as described below.

1. The input detection module includes a bi-directional photoelectric coupler and a current-limiting resistor. More specifically, one terminal of the bi-directional photoelectric coupler is connected in series to one terminal of the current-limiting resistor, the other terminal of the bi-directional photoelectric coupler is connected to the neutral wire terminal of the power input side, and the other terminal of the current-limiting resistor is connected to the live wire terminal of the power input side. However, the embodiment is only exemplified but is not intended to limit the scope of the disclosure. In other words, the other terminal of the bi-directional photoelectric coupler can be connected to the live wire terminal of the power input side, and the other terminal of the current-limiting resistor can be connected to the neutral wire terminal of the power input side. In particular, the two embodiments can provide the same function of detecting the AC power source at the input side. In this embodiment, the input detection module and the power supply apparatus are isolated from ground to each other because the input detection module does not provide any independent grounding. Accordingly, it is to avoid the failed protection of the power supply apparatus from the detection malfunction of the input detection module.

When the AC power source normally supplies power to the power supply apparatus, namely, both the live wire and the neutral wire are normal, the AC power source is detected by the input detection module from the live wire terminal to the neutral wire terminal or from the neutral wire terminal to the live wire terminal so that the bi-directional photoelectric coupler is turned on. Accordingly, the bi-directional photoelectric coupler continually outputs a normal detection signal. When the power supply apparatus receives the normal detection signal, the power supply apparatus judges that the external AC power source can normally supply power to the power supply apparatus.

When the live wire or the neutral wire is abnormal, or the live wire and the neutral wire are both abnormal, the AC power source does not be outputted to the input detection module, that is, the input detection module does not receive the AC power source so that the bi-directional photoelectric coupler is turned off. Accordingly, the bi-directional photoelectric coupler stops outputting the normal detection signal. When the power supply apparatus does not receive the normal detection signal, the power supply apparatus judges that live wire or the neutral wire is abnormal, or the live wire and the neutral wire are both abnormal. Therefore, a protection mechanism of the power supply apparatus is started up to shut down the power supply apparatus, thus protecting the power supply apparatus.

2. The input detection module includes a full-wave rectifier, a diode, a first resistor, a first transistor switch, a capacitor, a photoelectric coupler, a second resistor, and a second transistor switch. An anode of the diode is electrically connected to a first output terminal of the full-wave rectifier. A drain of the first transistor switch is electrically connected to a first terminal of the first resistor, and a second terminal of the first resistor is electrically connected to a cathode of the diode. A gate of the first transistor switch is electrically connected to a first output terminal of the full-wave rectifier and the anode of the diode via a resistor. A drain of the second transistor switch is electrically connected to a first terminal of the second resistor, and a second terminal of the second resistor is electrically connected to a cathode of the photoelectric coupler. A gate of the second transistor switch is electrically connected to the drain of the first transistor switch and the first terminal of the first resistor. An anode of the photoelectric coupler is electrically connected to the cathode of the diode and a first terminal of the capacitor. A second terminal of the capacitor, a source of the first transistor switch, a source of the second transistor switch, and a second terminal of the full-wave rectifier are electrically connected to a module grounding. Especially, the module grounding is different from a grounding of the power supply apparatus, and the input detection module and the power supply apparatus are isolated from ground to each other. In addition, two input terminals of the full-wave rectifier are correspondingly electrically connected to the live wire terminal and the neutral wire terminal of the power input side.

When the AC power source normally supplies power to the power supply apparatus, namely, both the live wire and the neutral wire are normal, the AC power source is rectified by the full-wave rectifier to output a rectified voltage. On the one hand, the rectified voltage is divided by two divider resistors to generate a divided voltage to turn on the first transistor switch. On the other hand, the rectified voltage is provided to charge the capacitor via the diode. Accordingly, the second transistor switch and the photoelectric coupler are both turned on.

When the live wire or the neutral wire is abnormal, or the live wire and the neutral wire are both abnormal, the AC power source does not be outputted to the full-wave rectifier, that is, the full-wave rectifier does not output voltage so that the first transistor switch is turned off. At this time, the capacitor is discharged via a discharging path formed by the photoelectric coupler, the second resistor, and the second transistor switch. Accordingly, the photoelectric coupler outputs an abnormal detection signal to a protection mechanism of the power supply apparatus to shut down and further protect the power supply apparatus.

In conclusion, the present disclosure has following advantages:

1. According to the first embodiment of the input detection module 101, the input detection module 101 and the power supply apparatus 90 are isolated from ground to each other because the input detection module 101 does not provide any independent grounding. Accordingly, it is to avoid the failed protection of the power supply apparatus 90 from the detection malfunction of the input detection module 101. According to the second embodiment of the input detection module 102, the module grounding Gm is different from a grounding of the power supply apparatus, and the input detection module 102 and the power supply apparatus are isolated from ground to each other. Accordingly, it is to avoid the failed protection of the power supply apparatus 90 from the detection malfunction of the input detection module 102; and 2. According to the first embodiment of the input detection module 101, the bi-directional photoelectric coupler 1011 is turned off to stop outputting the normal detection signal when the input detection module 101 detects that the AC power source $V_S$ abnormally supplies power, thus shutting down the power supply apparatus 90 and protecting the power supply apparatus 90. According to the second embodiment of the input detection module 102, the photoelectric coupler 1026 is turned on to output the abnormal detection signal when the input detection module 102 detects that the AC power source $V_S$ abnormally supplies power, thus shutting down the power supply apparatus 90 and protecting the power supply apparatus 90.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply apparatus with input voltage detection, comprising:
    a power input side having a first input terminal and a second input terminal; the first input terminal electrically connected to a live wire of an AC power source, and the second input terminal electrically connected to a neutral wire of the AC power source; and
    an input detection module having a first detection terminal and a second detection terminal; the first detection terminal electrically connected to the first input terminal, and the second detection terminal electrically connected to the second input terminal;
    wherein the input detection module is configured to generate a detection signal to shut down the power supply apparatus so as to protect the power supply apparatus when the input detection module detects that the live wire or the neutral wire is abnormal, or the live wire and the neutral wire are both abnormal,
    wherein the input detection module comprises:
        a full-wave rectifier further having the first detection terminal, the second detection terminal, a first rectifying output terminal and a second rectifying output terminal;
        a diode electrically connected to the first rectifying output terminal;
        a first transistor switch electrically connected to the diode and the first rectifying output terminal;
        a photoelectric coupler having an anode and a cathode, the anode electrically connected to the diode;
        a second transistor switch electrically connected to the cathode of the photoelectric coupler; and
        a capacitor having a first terminal electrically connected to the anode of the photoelectric coupler; and a second terminal electrically connected to first transistor switch, the second transistor switch and the second rectifying output terminal.

2. The power supply apparatus with input voltage detection of claim 1, wherein
    the full-wave rectifier comprises a first rectifying input terminal, and a second rectifying input terminal, the first rectifying input terminal is the first detection terminal, and the second rectifying input terminal is the second detection terminal;
    the diode comprises an anode and a cathode, and the anode of the diode electrically connected to the first rectifying output terminal;
    the first transistor switch comprises a source, a drain, and a gate, the gate of the first transistor switch electrically connected to the first rectifying output terminal and the anode of the diode;
    the second transistor switch comprises a source, a drain, and a gate; and
    the first terminal of the capacitor is electrically connected to the cathode of the diode, and the second terminal of the capacitor, the source of the first transistor switch, the source of the second transistor switch, and the second rectifying output terminal are connected to a grounding module,
    wherein the input detection module further comprises:
        a first resistor having a first terminal and a second terminal; the drain of the first transistor switch electrically connected to the first terminal of the first resistor, the second terminal of the first resistor electrically connected to the cathode of the diode; and a second resistor having a first terminal and a second terminal; the drain of the second transistor switch electrically connected to the first terminal of the second resistor, the second terminal of the second resistor electrically connected to the cathode of the photoelectric coupler, and the gate of the second transistor switch electrically connected to the drain of the first transistor switch and the first terminal of the first resistor.

3. The power supply apparatus with input voltage detection of claim 1, wherein the AC power source is rectified by the full-wave rectifier to output a rectified voltage, and the rectified voltage is configured to turn on the first transistor switch and charge the capacitor so that the second transistor switch and the photoelectric coupler are turned off when the AC power source normally supplies power to the power supply apparatus; or the AC power source is not output to the full-wave rectifier to turn off the first transistor switch, and the capacitor is discharged via a discharging path formed by the photoelectric coupler, the second resistor, and the second transistor switch so that the detection signal outputted from the photoelectric coupler is an abnormal detection signal to shut down the power supply apparatus and protect the power supply apparatus when the live wire or the neutral wire is abnormal, or the live wire and the neutral wire are both abnormal.

4. The power supply apparatus with input voltage detection of claim 1, wherein the grounding module is different from a grounding of the power supply apparatus, and the input detection module is not commonly grounded with the rest of the power supply apparatus.

5. A method of operating a power supply apparatus with input voltage detection, the method comprising following steps of:
    (a) providing the power supply apparatus having a power input side, and the power input side having a first input terminal and a second input terminal; the first input terminal electrically connected to a live wire of an AC power source, and the second input terminal electrically connected to a neutral wire of the AC power source;
    (b) providing an input detection module having a first detection terminal and a second detection terminal; the first detection terminal electrically connected to the first input terminal, and the second detection terminal electrically connected to the second input terminal; and
    (c) generating a detection signal by the input detection module to shut down the power supply apparatus so as to protect the power supply apparatus when the input detection module detects that the live wire or the neutral wire is abnormal, or the live wire and the neutral wire are both abnormal,
    wherein the input detection module comprises:
        a full-wave rectifier further having the first detection terminal, the second detection terminal, a first rectifying output terminal and a second rectifying output terminal;
        a diode electrically connected to the first rectifying output terminal;
        a first transistor switch electrically connected to the diode and the first rectifying output terminal;
        a photoelectric coupler having an anode and a cathode, the anode electrically connected to the diode;
        a second transistor switch electrically connected to the cathode of the photoelectric coupler; and
        a capacitor having a first terminal electrically connected to the anode of the photoelectric coupler; and a second terminal electrically connected to first transistor switch, the second transistor switch and the second rectifying output terminal.

6. The method of operating the power supply apparatus with input voltage detection of claim 5, wherein
    the full-wave rectifier comprises a first rectifying input terminal, and a second rectifying input terminal, the first rectifying input terminal is the first detection terminal, and the second rectifying input terminal is the second detection terminal;
    the diode comprises an anode and a cathode, and the anode of the diode electrically connected to the first rectifying output terminal;
    the first transistor switch comprises a source, a drain, and a gate, the gate of the first transistor switch electrically connected to the first rectifying output terminal and the anode of the diode;
    the second transistor switch comprises a source, a drain, and a gate; and
    the first terminal of the capacitor is electrically connected to the cathode of the diode, and the second terminal of the capacitor, the source of the first transistor switch, the source of the second transistor switch, and the second rectifying output terminal are connected to a grounding module,
    wherein the input detection module further comprises:
        a first resistor having a first terminal and a second terminal; the drain of the first transistor switch electrically connected to the first terminal of the first resistor, the second terminal of the first resistor electrically connected to the cathode of the diode; and
        a second resistor having a first terminal and a second terminal; the drain of the second transistor switch electrically connected to the first terminal of the second resistor, the second terminal of the second resistor electrically connected to the cathode of the photoelectric coupler, and the gate of the second transistor switch electrically connected to the drain of the first transistor switch and the first terminal of the first resistor.

7. The method of operating the power supply apparatus with input voltage detection of claim 5, wherein the AC power source is rectified by the full-wave rectifier to output a rectified voltage, and the rectified voltage is configured to turn on the first transistor switch and charge the capacitor so that the second transistor switch and the photoelectric coupler are turned off when the AC power source normally supplies power to the power supply apparatus; or the AC power source is not output to the full-wave rectifier to turn off the first transistor switch, and the capacitor is discharged via a discharging path formed by the photoelectric coupler, the second resistor, and the second transistor switch so that the detection signal outputted from the photoelectric coupler is an abnormal detection signal to shut down the power supply apparatus and protect the power supply apparatus when the live wire or the neutral wire is abnormal, or the live wire and the neutral wire are both abnormal.

8. The method of operating the power supply apparatus with input voltage detection of claim 5, wherein the grounding module is different from a grounding of the power supply apparatus, and the input detection module is not commonly grounded with the rest of the power supply apparatus.

* * * * *